US008532805B2

(12) United States Patent
Mazzarone et al.

(10) Patent No.: US 8,532,805 B2
(45) Date of Patent: Sep. 10, 2013

(54) SYSTEM AND METHOD FOR CONTROLLING A MANUFACTURING PROCESS

(75) Inventors: Marco Mazzarone, Genoa (IT); Alessandro Raviola, Genoa (IT); Elena Reggio, Genoa (IT); Federico Risso, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 227 days.

(21) Appl. No.: 13/042,895

(22) Filed: Mar. 8, 2011

(65) Prior Publication Data
US 2011/0224814 A1 Sep. 15, 2011

(30) Foreign Application Priority Data

Mar. 9, 2010 (EP) .................................. 10155978

(51) Int. Cl.
*G06F 19/00* (2011.01)
(52) U.S. Cl.
USPC ............... 700/96; 700/99; 700/103; 700/104; 703/2
(58) Field of Classification Search
USPC ............................. 700/95–97, 99–104; 703/2
See application file for complete search history.

(56) References Cited

U.S. PATENT DOCUMENTS

| | | | | |
|---|---|---|---|---|
| 6,671,570 B2 * | 12/2003 | Schulze | ........................ | 700/121 |
| 6,738,682 B1 * | 5/2004 | Pasadyn | ........................ | 700/100 |
| 6,988,017 B2 * | 1/2006 | Pasadyn et al. | ............... | 700/121 |
| 7,082,345 B2 * | 7/2006 | Shanmugasundram et al. | ............................. | 700/121 |
| 7,123,980 B2 * | 10/2006 | Funk et al. | .................... | 700/121 |
| 8,032,243 B2 * | 10/2011 | Raviola et al. | ................ | 700/103 |
| 8,285,410 B2 * | 10/2012 | Raviola | ......................... | 700/103 |
| 8,295,964 B2 * | 10/2012 | Reggio et al. | ................. | 700/102 |
| 2005/0187649 A1 * | 8/2005 | Funk et al. | .................... | 700/121 |
| 2005/0198609 A1 * | 9/2005 | Hwang et al. | .................. | 716/21 |
| 2007/0078556 A1 * | 4/2007 | Stirton et al. | ................. | 700/108 |
| 2008/0015818 A1 * | 1/2008 | Hwang et al. | ................. | 702/185 |

(Continued)

OTHER PUBLICATIONS

Cheng, F., et al., "Development of a Distributed Object-Oriented System Framework for the COmputer-Integrated Manufacturing Execution System", Proceedings of the 1998 IEEE Internation Conference on Robotics & Automation, May 1998, pp. 2116-2121, Leuven, Belgium.

(Continued)

*Primary Examiner* — Ramesh Patel
(74) *Attorney, Agent, or Firm* — Laurence A. Greenberg; Werner H. Stemer; Ralph E. Locher

(57) ABSTRACT

A method and a system control a manufacturing process of a plant via a MES system. The MES system is provided with a catalogue of a tool model, the catalogue of the tool model contains tool entities and tool methods on the tool entities. The tool entities contain engineering-time tool entities and run-time tool entities and the tool methods contain engineering-time tool methods and run-time tool methods. At engineering time or at run time, via a tool manager, the tool model catalogue is exposed and information on the tool model data is stored in a database. At engineering time, the specific engineering-time tool entities are defined by invoking engineering-time tool methods. At run time the specific tool entities are instantiated into run-time tool objects and the manufacturing process is controlled relative to physical plant tools by invoking the run-time tool methods on the run-time tool objects.

6 Claims, 4 Drawing Sheets

(56) References Cited

U.S. PATENT DOCUMENTS

| | | | |
|---|---|---|---|
| 2009/0076785 A1* | 3/2009 | Raviola et al. | 703/6 |
| 2009/0287337 A1* | 11/2009 | Raviola | 700/103 |
| 2010/0057236 A1* | 3/2010 | Reggio et al. | 700/100 |
| 2010/0138026 A1* | 6/2010 | Kaushal et al. | 700/104 |
| 2011/0153574 A1* | 6/2011 | Solimano et al. | 707/687 |

OTHER PUBLICATIONS

Ericsson, G., "Functional Specification of Industrial Control Systems An Object-Oriented Approach", Industrial Control Systems, KTH, Royal Institute of Technology, 1994, pp. 1347-1352, Stockholm, Sweden.

Gnauck, K., et al., "Development of a Universal Model for Description of Intelligent Field Devices through the Life-Cycle", Industrial Communications, Institute of Applied Computer Science, Faculty of Computer Science, TU Dresden, 01062 Dresden, Germany, 2009.

Kastner, W., et al., "EDDL inside FDT/DTM", TU Wien, 2004 pp. 365-368, Vienna, Austria.

ISA-dS95.00.01-2000—Draft Standard, "Enterprise—Control System Integration Part 1: Models and Terminology" Draft 15, Jan. 2000.

ISA Draft 95.00.02, "Enterprise—Control System Integration Part 2: Object Model Attributes", Draft 5, Aug. 2000.

Thilo Sauter: "The Continuing Evolution of Integration in Manufacturing Automation", IEEE Industrial Electronics Magazine, IEEE, US, vol. 1, No. 1, Mar. 1, 2007, pp. 10-19, XP011184485, ISSN: 1932-4529.

Bianca Scholten: "Integrating ISA-88 and ISA-95" ISA Expo 2007, Oct. 2-4, 2007, retrieved from the Internet: URL:http://www.isa.org/filestore/Division_TechPapers/GlassCeramics/Integrating_TPEXPO140.pdf [retrieved on Jul. 20, 2012].

* cited by examiner

SYSTEM AND METHOD FOR CONTROLLING A MANUFACTURING PROCESS

CROSS-REFERENCE TO RELATED APPLICATION

This application claims the priority, under 35 U.S.C. §119, of European application EP 10 155 978.9, filed Mar. 9, 2010; the prior application is herewith incorporated by reference in its entirety.

BACKGROUND OF THE INVENTION

Field of the Invention

The invention relates to a method and a system for controlling a manufacturing process, especially in a production facility employing a computer managed manufacturing execution system (MES).

As defined by the Manufacturing Enterprise Solutions Association (MESA International), a MES system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

The functions that MES systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, Siemens Corporation offers a broad range of MES products, under its SIMATIC® product family.

Typically, at engineering time, MES client applications are used by system engineers for customizations according to the specific manufacturing plant requirements. Instead, at runtime, MES client applications are utilized by end-users such as plant operators or line responsible personnel.

An accurate modeling of the manufacturing process is essential for both scheduling and execution and to eventually achieve a good level of operational performance in manufacturing activities.

A well known example of a model for manufacturing is found in a standard called ISA-595. The standard ISA S95 is an extension by a batch mode of the ISA S88 standard for process control engineering in manufacturing, applicable for discrete and continual production types. It defines schemes for the individual production steps, the schemes containing rules about information exchange between different production phases required in the manufacturing execution system.

The ISA-S95 standard is the common basis used for the development of MES systems. It consists of several parts each of them with a specific scope. In particular, Part 2 of the ISA-S95 standard deals with the object model representing the entities involved in a manufacturing process, by defining models for production capabilities, process segment capabilities, personnel, equipment, materials, process segments, product definition information, production schedules and production performances.

Such entities represent the resources to be used during the execution of a production request. For example, the production request for a set of wheel covers requires some material like plastic shields and some tools and equipment in order to perform holes in the plastic shields.

Unfortunately, the ISA-S95 standard does not deal with the management of tools.

Tools can be defined as the auxiliary instruments used in a manufacturing process such as tools to be mounted on equipment units (e.g. a perforation instrument) or tools to be utilized for production purposes (e.g. measuring instruments).

Thus, when an MES system is required to define and handle the tools and instruments used in the product manufacturing, existing ISA-S95 models need to be used, as for example the equipment model.

The equipment model defines all units of a production compartment such as the enterprise, site, production area, cell, machinery and it is usually intended for fixed units. As written in Part 1 of the ISA-S95 standard "the equipment model contains the information about specific equipment, the classes of equipment, equipment capability tests, and maintenance information associated with equipment". In the ISA-S95 standard it is also present an "a priori" defined hierarchical structure among elements such as enterprise, site, area, cell, or unit. FIG. 1 shows the equipment hierarchy and it is taken from FIG. 4 of Part 1 of the ISA-S95 Standard.

However, using the existing ISA-S95 equipment model for defining tool requirements is not optimal for controlling production processes of manufacturing plants.

In fact the drawback is that the requirements of tools may be misrepresented so that the overall manufacturing requirements are negatively affected.

SUMMARY OF THE INVENTION

It is accordingly an object of the invention to provide a system and a method for controlling a manufacturing process which overcome the above-mentioned disadvantages of the prior art methods and devices of this general type, by providing a method and a system for controlling a manufacturing process that takes into account the specific requirements in term of tools.

The aforementioned aim is achieved by a method and a system for controlling a manufacturing process of a plant via a MES system. The method includes providing the MES system with a catalogue of a tool model. The catalogue of the tool model contains tool entities and tool methods on the tool entities. The tool entities contain engineering-time tool entities and run-time tool entities and the tool methods contain engineering-time tool methods and run-time tool methods. At engineering time or at run time, via a tool manager, the tool model catalogue is exposed and information on the tool model data is stored in a database. At engineering time, specific engineering-time tool entities are specified by invoking engineering-time tool methods. At run time, the specific tool entities are instantiated into run-time tool objects and the manufacturing process is controlled relative to physical plant tools by invoking the run-time tool methods on the run-time tool objects.

In embodiments of the proposed invention, the engineering-tool entities may advantageously be selected from the group consisting of a tool type entity, a tool class entity, a tool definition entity, a bill of tools entity, and a bill of tool items entity.

In embodiments of the proposed invention, the run-time tool entity may conveniently be a tool object.

In embodiments of the proposed invention, the run-time entities may preferably be selected from the group consisting of moving a tool instance into a target location, assembling a tool instance according to its bill of tools, and tracing a tool instance.

In embodiments of the proposed invention, the tool model may advantageously be added to the personnel model, to the equipment model and the material model of the product definition model of the ISA-S95 standard.

With embodiments of the proposed invention, the MES tool management optimally mirrors the physical instrument management performed during the product manufacturing of the plant.

With embodiments of the proposed invention, an easy and flexible MES tool management is provided.

Furthermore, a computer program element can be provided, containing computer program code for performing steps according to the above mentioned method when loaded in a digital processor of a computing device.

Additionally, a computer program product stored on a computer usable medium, for example, a computer-readable medium can be provided. The computer—readable medium contains computer readable program code, for example, computer—executable instructions for causing a computing device to perform the mentioned method.

Other features which are considered as characteristic for the invention are set forth in the appended claims.

Although the invention is illustrated and described herein as embodied in a system and a method for controlling a manufacturing process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 2:
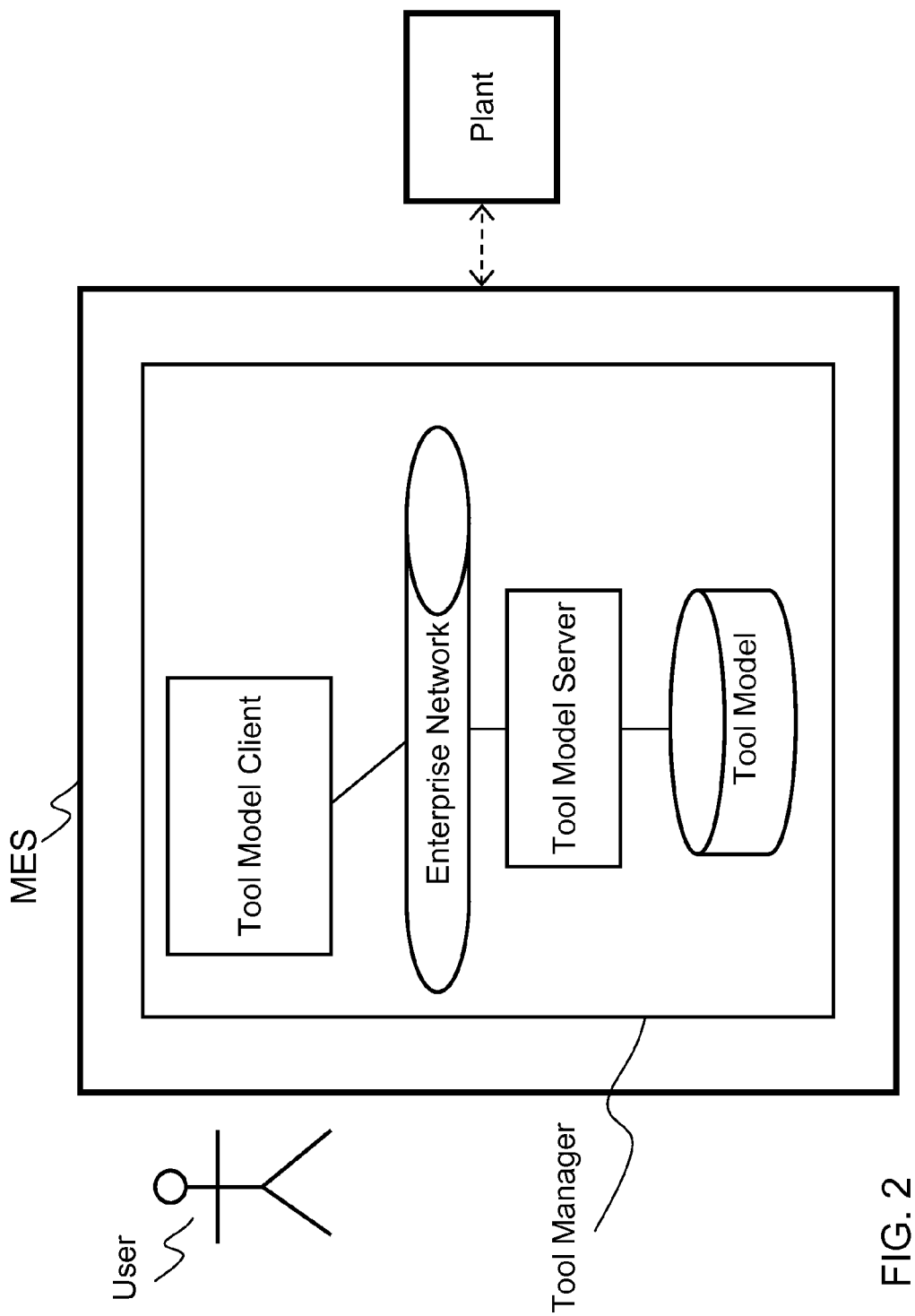
FIG. 2 is a block diagram which schematically illustrates a MES computer system according to an exemplary embodiment of the invention.

Referring now to the figures of the drawing in detail and first, particularly, to FIG. 2 thereof, there is shown a block diagram schematically illustrating a MES computer system according to an exemplary embodiment of the invention. In FIG. 2 it is depicted a MES system used by a user for controlling a manufacturing process of a plant. The MES system contains a tool manager for exposing to the user a tool model catalogue containing tool entities and tool methods which can be customized by the user according to specific plant requirements. A user may be a system engineer or production line personnel. As explained above, usually at engineering time the user is a system engineer and at run time the user is a production line operator. However, in embodiments of the present invention, at run time there is not always a direct interaction with the line operator and the MES system may automatically react through rules that invoke a sequence of methods.

The tool manager usually has a server side and a client side connected via an enterprise network connection. The tool manager server side contains a database in which the tool manager stores information on the tool model and a tool model server. The tool manager client side contains a tool model client in communication with the tool model server.

According to the proposed invention, the MES system is provided with a catalogue of an object oriented tool model containing tool entities and tool methods on the tool entities. The tool entities/methods can be splitted in two logical sub-groups: the tool entities/methods for engineering time and the tool entities/methods for run time.

At engineering time, specific engineering time tool entities are defined by invoking the engineering time tool methods.

At run time, the specific tool entities are instantiated into object tools and the run time methods are invoked so that the manufacturing process of the plant can be controlled by the MES system where the instantiated object tools are corresponding to physical tools/instruments of the manufacturing plant.

More in details, a tool model catalogue is created with object oriented architecture preferably with types, classes, properties, functionalities and relationships as below explained in the detailed description of FIG. 3.

During the engineering phase, the tool model catalogue exposed by the tool manager is used by a system engineer to define and characterize specific tool entities by using the engineering time methods following the specific requirements of the specific plant. During the run time phase, the correspondence between the tool database records and the tool physical objects of the specific plant is created by instantiating the runtime object tools so that the abstract tool entities are rendered concrete tool objects. Moreover, at run time, the run-time tool methods are invoked such as, for example, tool maintenance, tool movements and tool utilization.

Figure 3:
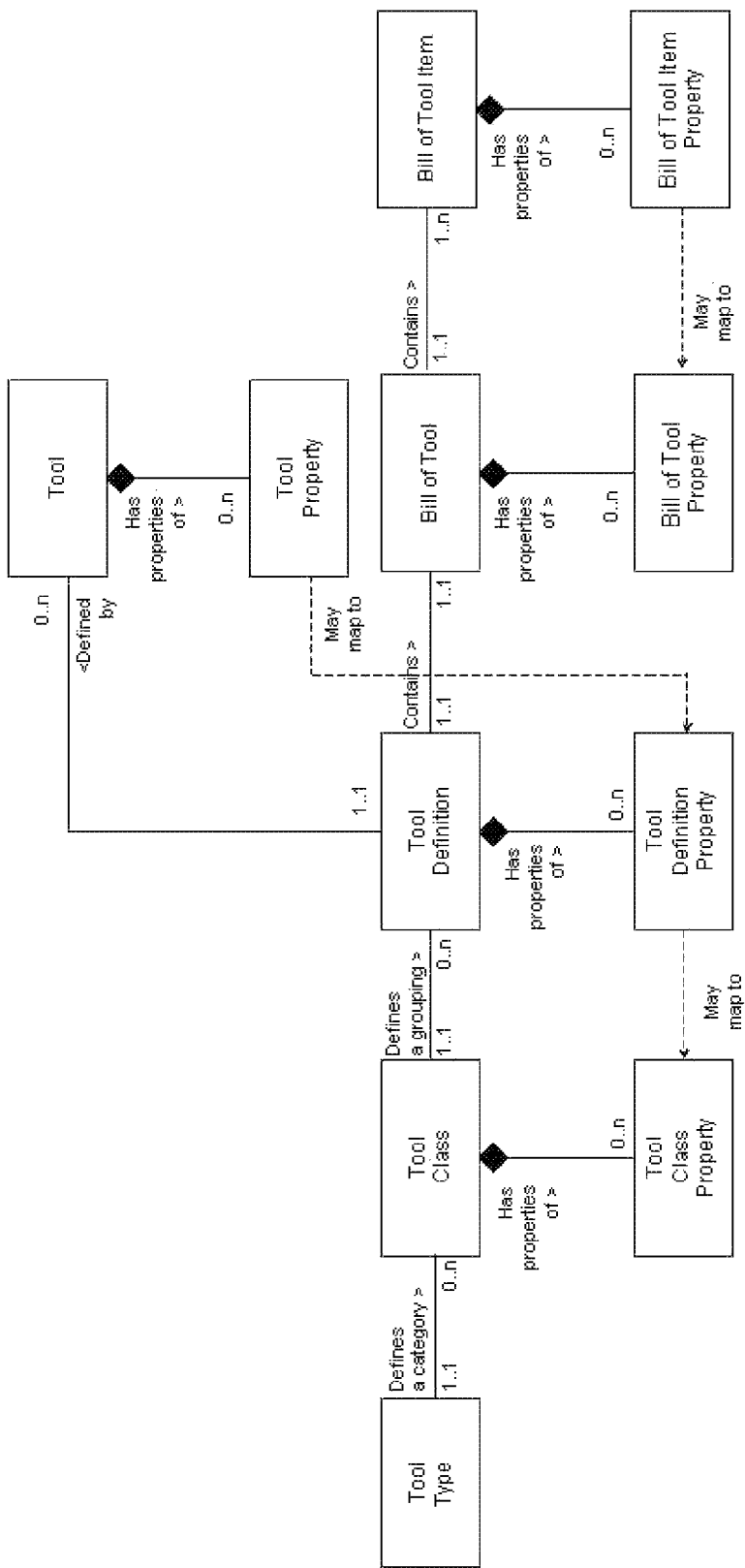
FIG. 3 is a block diagram which schematically illustrates a tool model according to an exemplary embodiment of the invention.

FIG. 3 is a block diagram which schematically illustrates a tool model according to an exemplary embodiment of the invention. The catalogue for the tool model may contain one or more of the following six entities: "tool type", "tool class", "tool definition", "bill of tools", "bill of tool items" and "tool". Properties are attributes not a priory-defined, thus, being custom fields, they are useful to better specify the tool entities.

The "tool type" is an entity for categorizing tools according to custom typologies. For example, a tool type may be a macro-category defining the objective of the tool category such as for example measurement tools, perforation tools, cutting tools and other.

The "tool class" is an entity for representing a set of tools sharing the same set of properties. The tool class is a category more detailed than the tool type. For example, in the tool type of measurement tools there may be tool classes such as weighing machines, thermometers and barometers.

The "tool definition" is an entity which allows the creation of tool templates and the management of versioning, of bill of tools and of properties. For example, the tool definition may be a grouping detailing whether a weighing machine has a 0-1 Kg scale for weighing chemical powders or a an over 500 Kg scale for weighing vans and trucks; and the versioning may be the weighing machine brand.

The "bill of tools" is an entity which allows defining the combination of tools that compose a more complex tool. The "bill of tool items" is an entity representing an item in the bill of tools with specific quantity and values. The bill of tools and the bill of tool items exist only for complex tools and do not exist for simple tools. A "simple tool" does not need to be assembled to be used in production and is based on a tool definition without bill of tool specification. A complex tool, instead, is composed by other tool items and must be assembled according to its bill of tools before it can be used, thus it must be based on a tool definition that specifies a bill of tools. An example of a simple tool which does not require assembly may be a screw-driver and an example of a complex tool which requires some assembling may be a drilling machine.

The "tool" is an entity representing a specific tool instance used in the production phase at run time.

Of the above six tool entities, the first five tool entities are abstract entities which are defined at engineering time while the sixth entity, i.e. the "tool", is a more concrete entity which instantiates a physical object at runtime.

As shown in FIG. 3, a tool type can group one or more tool classes and a tool class can belong to one tool type only. From a tool class one or more tool definition can be derived.

When a tool definition is created starting from a tool class, it inherits all the properties defined in the parent class along with the configured values. A tool definition can belong to one tool class only. Each tool definition can be configured with its own properties and bill of tools. Each tool definition can have one bill of tools only. The bill of tools defines the items required to assemble and use a tool object in the product manufacturing. By means of the bill of tools simple and complex tools can be differentiated: in fact, a bill of tools owns one or more items. Each item is defined univocally by its identifier and refers always an existing tool definition. In the bill of tools there can be different items referring the same tool definition.

Tool objects are created from a version of a tool definition. Once a tool object is created, it derives all properties and default values from the parent definition version. At runtime, each object is provided with its own attributes and life cycle values.

For the tool entities shown in FIG. 3, a set of methods or APIs is provided within the tool model catalogue of the MES system aimed at providing:

during the engineering phase, the engineering actions needed for working with the tool entities; and during the run time phase, the run time actions for instantiating tool objects and for controlling the manufacturing process in the plant as regards tool actions.

Such tool methods contain engineering-time tool methods and run-time tool methods.

The engineering-time tool methods may contain: "tool type methods", "tool class methods", "tool definition methods", and "bill of tools methods".

The tool type methods may contain one or more of the following methods: adding a tool type to the MES system, removing a tool type from the system, changing the tool type configuration, getting the configuration of a tool type, getting a list of tool types and configurations and other examples of tool type methods.

The tool class methods may contain one or more of the following methods: creating a tool class, removing a tool class, changing the tool class configuration, getting the configuration settings of a tool class and other examples of tool type methods.

Methods on tool class properties may contain one or more of the following methods: adding a property to a tool class, adding new values to a tool class property, remove a tool class property, change the current values of a tool class property, getting the list of tool class properties, getting the list of values of a tool class property and other examples of tool class property methods.

The tool definition methods may contain one or more of the following methods: creating a tool definition and its first version, changing name and description of a tool definition (and of all its versions), removing a tool definition, tracing tool definition objects performing advanced queries, getting the details of a tool definition, getting the details of a list of tool definition objects and other examples of tool definition methods.

Methods on tool definition versions may contain one or more of the following methods: creating a new version of a tool definition, removing a version of a tool definition, changing the label and comments of a version of a tool definition, getting the list of bill of tools objects of a version of a tool definition, setting as current a version of a tool definition and other examples of tool definition methods.

Methods on tool definition properties may contain one or more of the following methods: adding a property to a version of a tool definition, adding new values to a property of a version of a tool definition, removing a property of a version of a tool definition, changing the values of a version of a tool definition, getting the list of properties of a version of a tool definition, getting the values of a property of a version of a tool definition and other examples of tool definition methods.

The bill of tools methods may contain one or more of the following methods: creating a bill of tools, removing a bill of tools, changing name, description and validity of a bill of tools, getting the details of a bill of tools, getting the list of bill of tools objects of a tool definition, getting the list of Items of a bill of tools and other examples of bill of tools methods.

Methods on bill of tool items may contain one or more of the following methods: adding an item to a bill of tools, removing an item from a bill of tools, changing description, quantity, sequence and comment of an item of a bill of tools, getting the details of an item of a bill of tools and other examples of bill of tool items methods.

The run-time tool methods, invokable at run time, may contain: "tool methods", "tool tracing methods", "product manufacturing methods" and "advanced tool methods".

The tool methods may contain one or more of the following methods: creating a tool (i.e. instantiating a tool object), copying a tool, changing a tool, deleting a tool and other examples of tool methods.

The tool tracing methods may contain one or more of the following methods: tracing the tool definitions, tracing the operations performed on the tools, tracing the tools and other examples of tool tracing methods.

The product manufacturing methods on tool instances may contain one or more of the following functionalities: attaching a tool instance to a handling unit, detaching a tool instance from a handling unit, moving a tool instance into a target location, eventually by a handling unit, changing the status of a tool instance, assembling a tool instance according to its bill of tools, dismantling a tool instance, setting a tool instance in use, removing a tool instance from use, locking a tool instance from operations and transitions, unlocking a tool instance, performing a custom operation on a tool and other examples of product manufacturing operations.

The advance tool methods may contain one or more of the following functionalities: creating tool assemblies from tool components, mounting and dismounting tools on equipment, maintenance operations due to tool usage, testing and certificating tools to ensure readiness to usage, certificating of personnel qualified to operate a tool, recording tool life, changing location and configuration of tools, disassembling tool assemblies and removing from inventory, scrapping tool components as the result of life cycle, recording tool genealogy since a tool may contaminate the final product and other examples.

Figure 1:
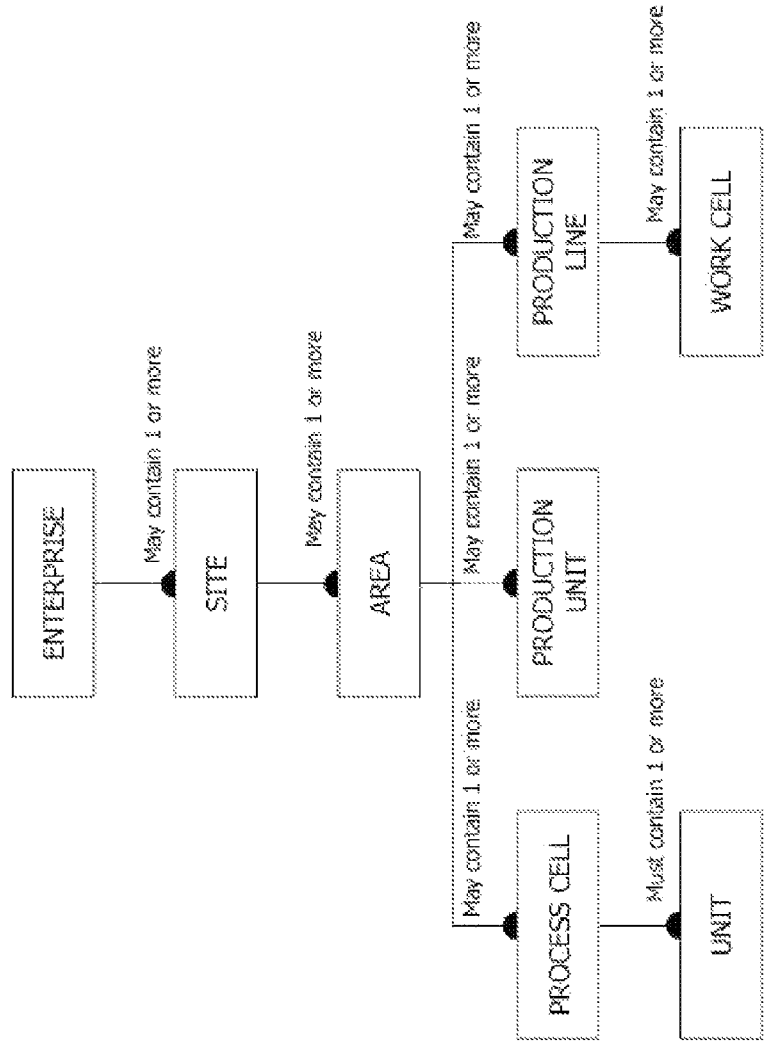
FIG. 1 is a block diagram of a hierarchical structure of an equipment model taken from the ISA-S95 standard.

The management of information about equipment/instrument resources is a critical activity controlled by the MES system. With embodiments of the proposed invention, such information management is rendered more flexible. In fact, tool elements do not need to be defined in hierarchical structure as the equipment elements are defined in the ISA-S985 standard (see FIG. 1). Moreover, tool elements can be moved from a location to another and associated to different equipment elements.

Figure 4:
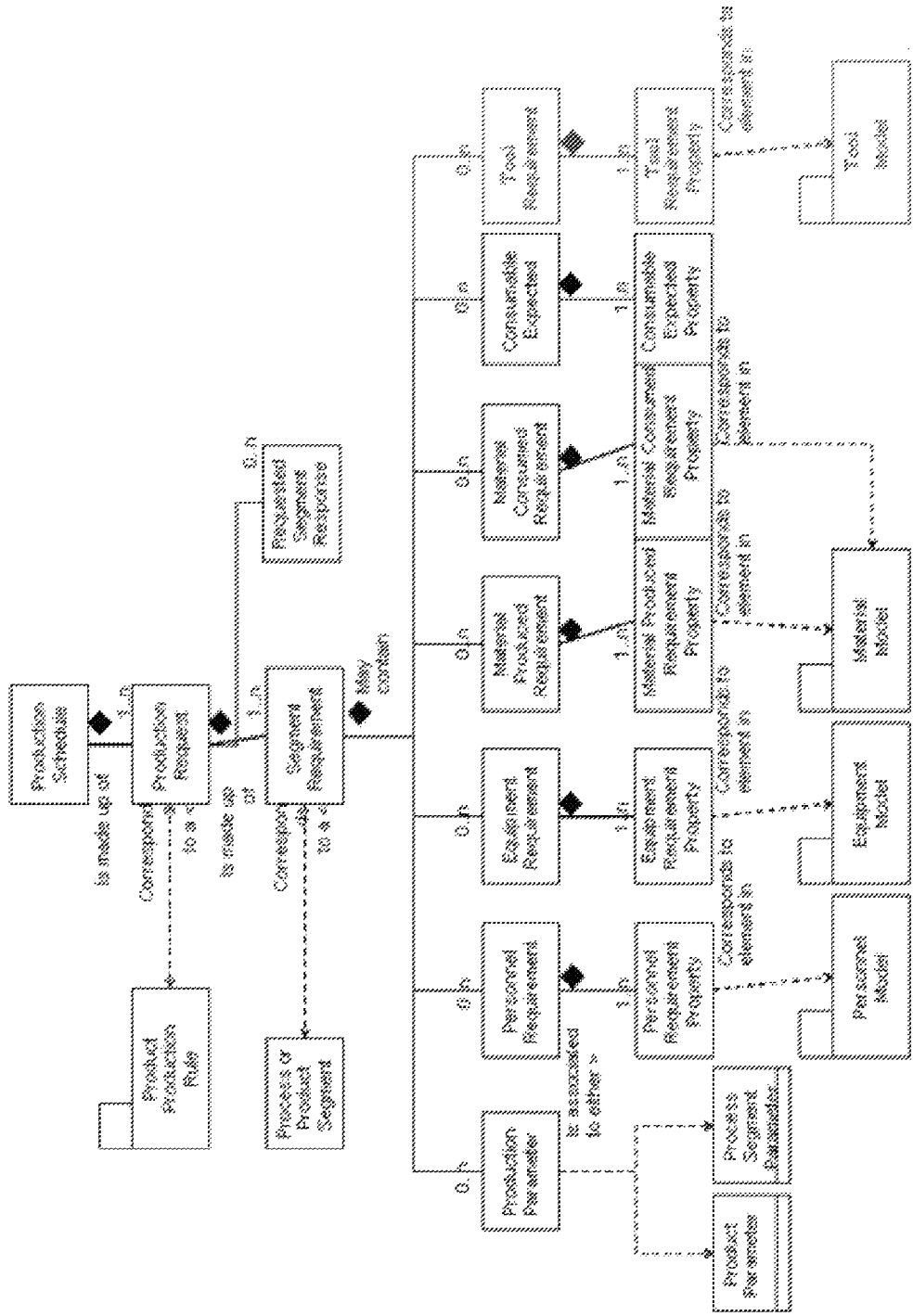
FIG. 4 is a block diagram representing an extension of the product definition model of the ISA-S95 standard according to an exemplary embodiment of the invention.

FIG. 4 is a block diagram representing an extension of the product definition model of the ISA-S95 standard according to an exemplary embodiment of the invention.

The product definition model of the ISA-S95 is depicted in FIG. 10 of Part 2 of the ISA-S95 standard. In an embodiment of the invention, the tool model may be added to the resource models already defined by the ISA-S95 standard such as the equipment model, personnel model and material model as shown in the right section of FIG. 4.

In this way, also tool requirements may be contained in a segment requirement.

In the "Tool Requirement" block depicted in FIG. 4 there may be tool entities such as types, classes, definitions, tools and tool methods. The Tool Requirement list allows the user to define composite alternatives of tools. In the tool model there is the run time and engineering time catalogue. For example, a Segment Requirement may be exemplified by the first mixing operation required for prepared a chocolate cake, while a Tool Requirement may be exemplified by a specific mixer required for performing such first mixing operation. Advantageously, the risk of inconsistent tool allocation is deeply minimized.

The invention claimed is:

1. A method for controlling a manufacturing process of a plant via a MES system, which comprises the steps of:
   providing the MES system with a tool model catalogue, the tool model catalogue containing tool entities and tool methods on the tool entities, the tool entities contain engineering-time tool entities and run-time tool entities and the tool methods contain engineering-time tool methods and run-time tool methods;
   at engineering time or at run time, via a tool manager, exposing the tool model catalogue and storing information on tool model data in a database;
   at the engineering time, defining specific engineering-time tool entities by invoking the engineering-time tool methods;
   at the run time, instantiating the specific tool entities into run-time tool objects; and
   at the run time, controlling the manufacturing process relative to physical plant tools by invoking the run-time tool methods on the run-time tool objects.

2. The method according to claim 1, wherein the engineering-tool entities are selected from the group consisting of a tool type entity, a tool class entity, a tool definition entity, a bill of tools entity, and a bill of tool items entity.

3. The method according to claim 1, wherein the run-time entity is a tool entity.

4. The method according to claim 1, wherein the run-time entities are selected from the group consisting of moving a tool instance into a target location, assembling a tool instance according to its bill of tools, and tracing a tool instance.

5. The method according to claim 1, wherein the tool model is added to a personnel model, to an equipment model and a material model of a product definition model of a ISA-S95 standard.

6. A non-transitory computer-readable medium having computer-executable instructions for performing a method for controlling a manufacturing process of a plant via a MES system, which comprises the steps of:
   providing the MES system with a tool model catalogue, the tool model catalogue containing tool entities and tool methods on the tool entities, the tool entities contain engineering-time tool entities and run-time tool entities and the tool methods contain engineering-time tool methods and run-time tool methods;
   at engineering time or at run time, via a tool manager, exposing the tool model catalogue and storing information on tool model data in a database;
   at the engineering time, defining specific engineering-time tool entities by invoking the engineering-time tool methods;
   at the run time, instantiating the specific tool entities into run-time tool objects; and
   at the run time, controlling the manufacturing process relative to physical plant tools by invoking the run-time tool methods on the run-time tool objects.

* * * * *